(12) United States Patent
Lee et al.

(10) Patent No.: US 10,540,369 B2
(45) Date of Patent: Jan. 21, 2020

(54) ORG SYNC SUSPEND AND RESUME DATA SYNC

(71) Applicant: salesforce.com, inc., San Francisco, CA (US)

(72) Inventors: Jong Lee, Pleasanton, CA (US); Patrick Beyries, Sunnyvale, CA (US); Yamuna Esaiarasan, Fremont, CA (US); Jacob Isaac, San Jose, CA (US); Sindhubala Ulavapalli, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 392 days.

(21) Appl. No.: 15/384,157

(22) Filed: Dec. 19, 2016

(65) Prior Publication Data
US 2018/0173779 A1  Jun. 21, 2018

(51) Int. Cl.
| | | |
|---|---|---|
| G06F 16/30 | (2019.01) | |
| G06F 16/27 | (2019.01) | |
| G06F 9/48 | (2006.01) | |

(52) U.S. Cl.
CPC .............. *G06F 16/27* (2019.01); *G06F 9/485* (2013.01)

(58) Field of Classification Search
CPC ...................................................... G06F 16/27
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

OTHER PUBLICATIONS

Article entitled "Salesforce Winter '16 Release Notes", dated Oct. 17, 2015, by Salesforce.*

(Continued)

*Primary Examiner* — Mahesh H Dwivedi
(74) *Attorney, Agent, or Firm* — Weaver Austin Villeneuve & Sampson LLP

(57) ABSTRACT

Disclosed are some implementations of systems, apparatus, methods and computer program products for temporarily suspending data synchronization between a primary organization and a secondary organization. The primary organization may suspend data synchronization in response to a manual command. Alternatively, the primary organization may suspend data synchronization automatically upon detection of communication failure(s) between the primary organization and the secondary organization.

20 Claims, 19 Drawing Sheets

(56) References Cited

U.S. PATENT DOCUMENTS

| | | |
|---|---|---|
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,229,888 B1 * | 7/2012 | Roskind ............ H04N 21/25808 707/611 |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,732,606 B2 | 5/2014 | Naderi et al. |
| 8,984,434 B2 | 3/2015 | Naderi et al. |
| 9,235,330 B2 | 1/2016 | Naderi et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0187007 A1 * | 8/2008 | Goyal ................ H04L 67/1095 370/503 |

(56) References Cited

U.S. PATENT DOCUMENTS

| | | |
|---|---|---|
| 2008/0249972 A1 | 10/2008 | Dillon |
| 2009/0006744 A1* | 1/2009 | Cavallo ................. G06F 1/3221 |
| | | 711/114 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky et al. |
| 2011/0246417 A1* | 10/2011 | Maya ..................... G06Q 10/08 |
| | | 707/610 |
| 2011/0247051 A1 | 10/2011 | Bulumulla et al. |
| 2011/0264765 A1* | 10/2011 | Devadhar ............... G06F 9/546 |
| | | 709/217 |
| 2011/0302133 A1* | 12/2011 | Kuruganti ............... H04L 67/06 |
| | | 707/608 |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0201145 A1* | 7/2014 | Dorman .................. G06F 16/27 |
| | | 707/634 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0263909 A1* | 9/2015 | Okubo .................... H04L 43/10 |
| | | 709/224 |
| 2016/0342671 A1* | 11/2016 | Leston ................... G06F 16/273 |
| 2017/0061364 A1* | 3/2017 | Waltz ................... G06F 16/2453 |

OTHER PUBLICATIONS

Article entitled "Salesforce APIs—What They Are & When to Use Them", dated Oct. 2011, by Siebold.*

"Google Plus Users", Google+Ripples, Oct. 31, 2011 [retrieved on Feb. 21, 2012 from Internet at http://www.googleplusers.com/google-ripples.html], 3 pages.

* cited by examiner

ORG SYNC SUSPEND AND RESUME DATA SYNC

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to a data synchronization process via which data is shared between organizations. More specifically, this patent document discloses techniques for suspending and resuming the data synchronization process.

BACKGROUND

"Cloud computing" services provide shared resources, applications, and information to computers and other devices upon request. In cloud computing environments, data can be provided by servers via the Internet rather than relying on data available locally on in-house computer systems. As such, users can interact with cloud computing services to undertake a wide range of tasks.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1A:
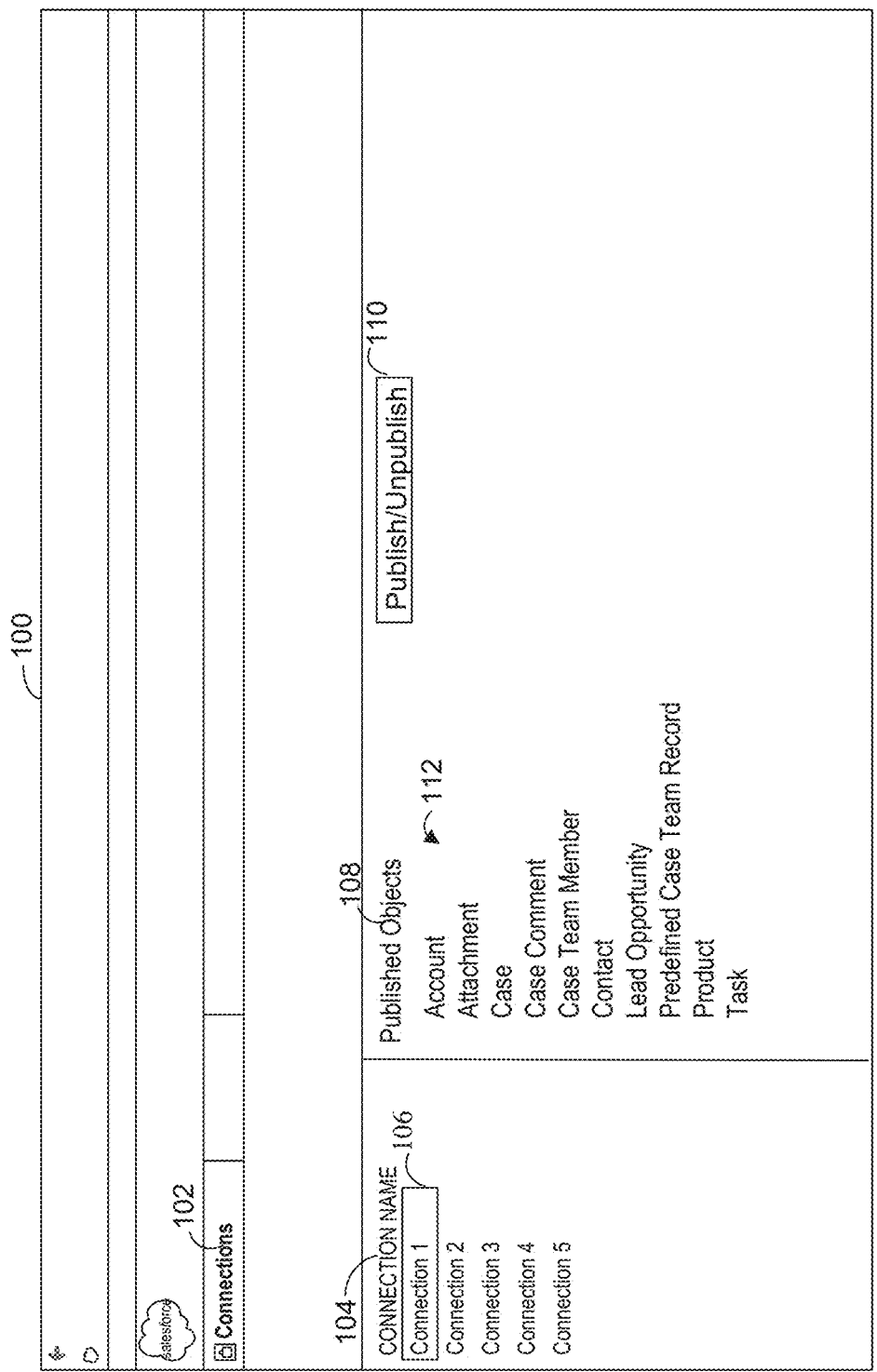
FIG. 1A shows an example of a user interface (UI) 100 for providing publication of objects and associated fields for synchronization of data, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

In accordance with various implementations, a system of a primary organization and a system of a secondary organization are each configured with an Organization Sync feature that allows data to be shared or synchronized between the primary organization and the secondary organization. Each system includes a database system implemented using at least one server system, where the database system includes at least one database. To simplify the following description, the system of the primary organization and the system of the secondary organization may be referred to as "primary organization" and "secondary organization," respectively.

In some of the disclosed implementations, techniques are provided to suspend and resume the Organization Sync process. Suspend and resume features may be activated manually or automatically.

Some implementations of the disclosed systems, apparatus, methods and computer program products are configured to provide a publish-and-subscribe process for sharing data between two different organizations. Through a publish-and-subscribe process, the types of data to be copied from the primary organization to the secondary organization may be specified. For example, a primary organization may publish a list of object types and associated fields that correspond to data items stored in database(s) of the primary organization and available for subscription by a secondary organization. The secondary organization may then subscribe to the published object types and fields or a subset thereof so that it may access data items corresponding to the subscribed object types and fields. In some instances, the object types and fields to which the secondary organization subscribes may map to different (e.g., custom) object types and/or fields of its own database(s). The published data types (e.g., object types and associated fields) may be referred to as "publish data," while the subset of the published data types to which the secondary organization has subscribed may be referred to as "subscription data."

A subscription process may subsequently be initiated by the secondary organization after the user of the secondary organization submits the subscription data via a user interface (UI). During the subscription process, the secondary organization ensures that the subscription data is provided to and saved by the primary organization. In addition, the subscription process may include mapping the subscription data to corresponding object types and associated fields of database(s) of the secondary organization.

After the subscription process has been successfully completed, the primary organization may initiate an organization synchronization process to share data items that correspond to the subscription data with the secondary organization. For example, the sharing of the data items by the primary organization may include initiating the updating (e.g., modifying, storing, or deleting) of data items within database(s) of the secondary organization. Once data synchronization is completed, users of the primary organization may be redirected to the secondary organization during periods when the primary organization is unavailable.

Unfortunately, in some instances, data synchronization may not successfully complete. More particularly, data synchronization may fail during periods that a connection between the primary organization and the secondary organization is not available. For example, the primary organization or secondary organization may be unavailable during periods that hardware or software is being updated by the primary organization or secondary organization. As another example, a failure of the connection between the primary organization and secondary organization may occur as a result of an unplanned event such as a power outage or hardware failure. When a transient failure of the connection between primary and secondary organizations occurs, data synchronization will be unsuccessful. Typically, the primary organization will continuously attempt to process data synchronization events while the connection is non-functional. As a result, the primary organization may perform unnecessary data replication or synchronization during periods that the connection between the primary organization and the secondary organization is not available.

In accordance with various implementations, to accommodate transient connection failures of a connection, data synchronization may be suspended by the primary organization. The primary organization may subsequently resume data synchronization, either in response to a manual command or automatically upon detecting that the connection is active. By suspending the data synchronization between the organizations, resources of the primary organization that would be unnecessarily consumed during the data synchronization process may be conserved.

In some implementations, the suspend-and-resume process may include suspending and resuming the connection between the primary and secondary organizations. By suspending the connection, resources consumed during additional processes such as the publish-and-subscribe process may also be conserved.

By way of illustration, John is an administrator at a primary organization, Pyramid Construction, Inc. John logs in to the primary organization and uses an online platform providing a UI that enables John to publish object types and associated fields that are available for subscription by a secondary organization, Universal Containers. Roy is an administrator at the secondary organization. Roy logs in to the secondary organization and uses an online platform to subscribe to the published object types and associated fields, or a subset thereof. As data in the database(s) of the primary organization is updated, the data is synchronized with that of the secondary organization. The disclosed techniques may be applied to suspend and resume the data synchronization process, as will be described in further detail below.

FIG. 1A shows an example of a user interface (UI) 100 for providing publication of objects and associated fields for synchronization of data, in accordance with some implementations. In FIG. 1A, UI 100 includes a variety of graphical components situated at different locations in UI 100. Connections tab 102 is one of possibly several or many tabs, which can be opened in UI 100. Each tab can be selected to access a respective page or segment of UI 100. In this example, after a user logs in to the primary organization, the user navigates to Connections tab 102 and selects Connections tab 102 to access connections component 104 of UI 100. Connections component 104 presents a number of existing connections in the Connection Name column of connections component 104. Each connection may represent a digital communication path that has been established between two different organizations. The user clicks on the name of a connection to select a particular connection 106 between two organizations. As shown in FIG. 1, Connection 1 between the primary organization and the secondary organization has been selected by the user of the primary organization.

In FIG. 1A, another component of UI 100 is a Published Objects component 108. In this example, Published Objects component 108 is configured with a Publish/Unpublish component 110, which the user can click on to publish specific object types and associated fields of database(s) of the primary organization. By the same token, the user can click on Publish/Unpublish component 110 to unpublish specific object types and/or associated fields of database(s) of the primary organization. More particularly, for a selected object type, the user may choose to publish at least a subset of the corresponding fields. In this example, the user clicks on Publish/Unpublish component 110, which enables the user to select object types, as well as specific fields of the selected object types.

As shown in FIG. 1A, after object types and associated fields have been published by the primary organization, the published object types may be presented in UI 100 as shown at 112. In this example, the published object types are displayed within Published Objects component 108.

Figure 1B:
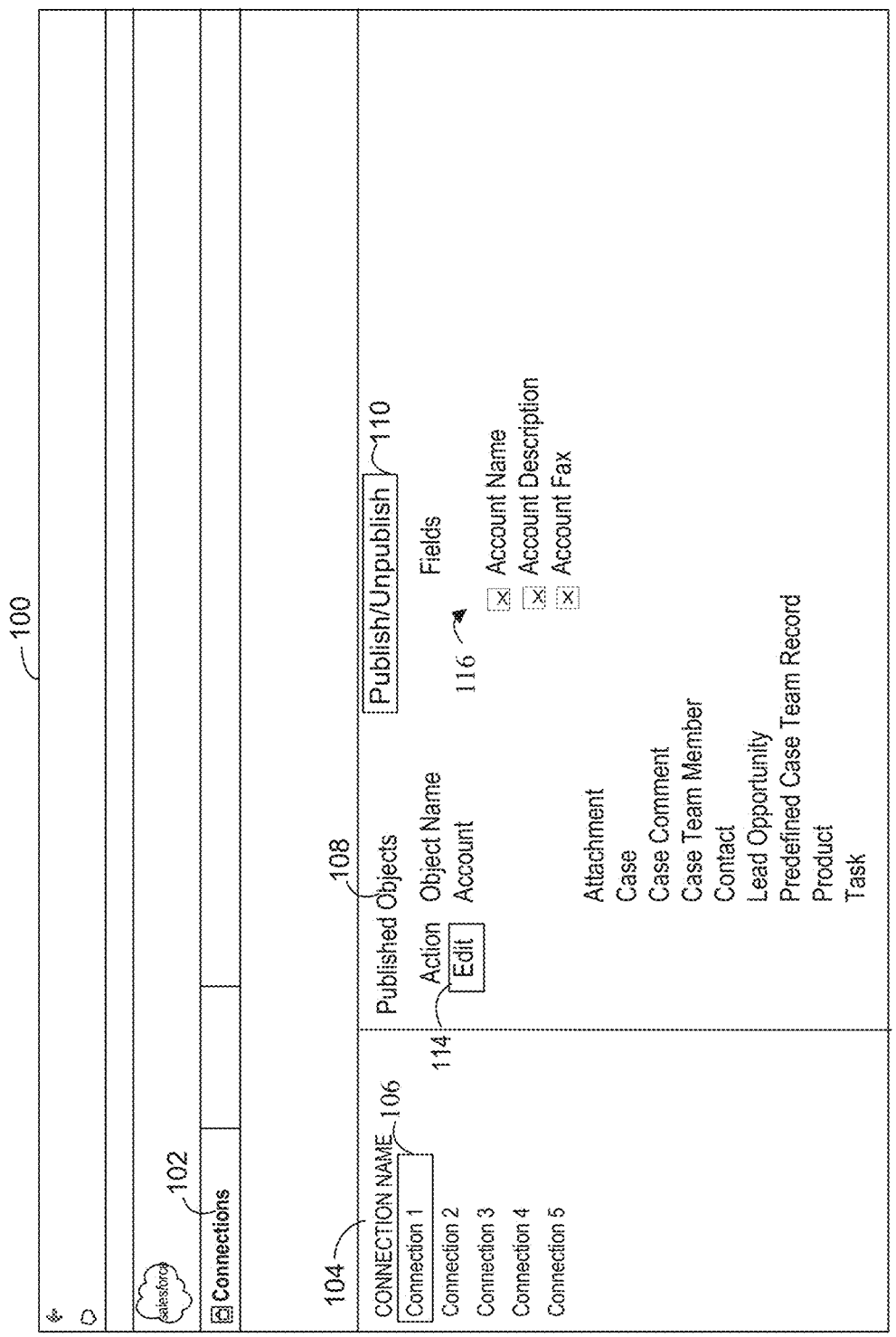
FIG. 1B shows an example of a different state of UI 100, in accordance with some implementations.

FIG. 1B shows an example of a different state of UI 100, in accordance with some implementations. If a user of the primary organization wishes to edit the fields that are published by the primary organization for subscription by the secondary organization, the user may click on an Edit component 114 to publish selected fields for a particular object type. In this example, the user has chosen to publish fields for the "Account" object type. As shown at 116, the user has elected to publish the "Account Name," "Account Description," and "Account Fax" fields of the "Account" object type. The term "publish data" may be used to refer to metadata that indicates the set of object types and associated fields that are published by the primary organization and available via subscription by the secondary organization. After the publish data has been updated and saved, the primary organization may make the publish data available to the secondary organization.

Figure 2A:
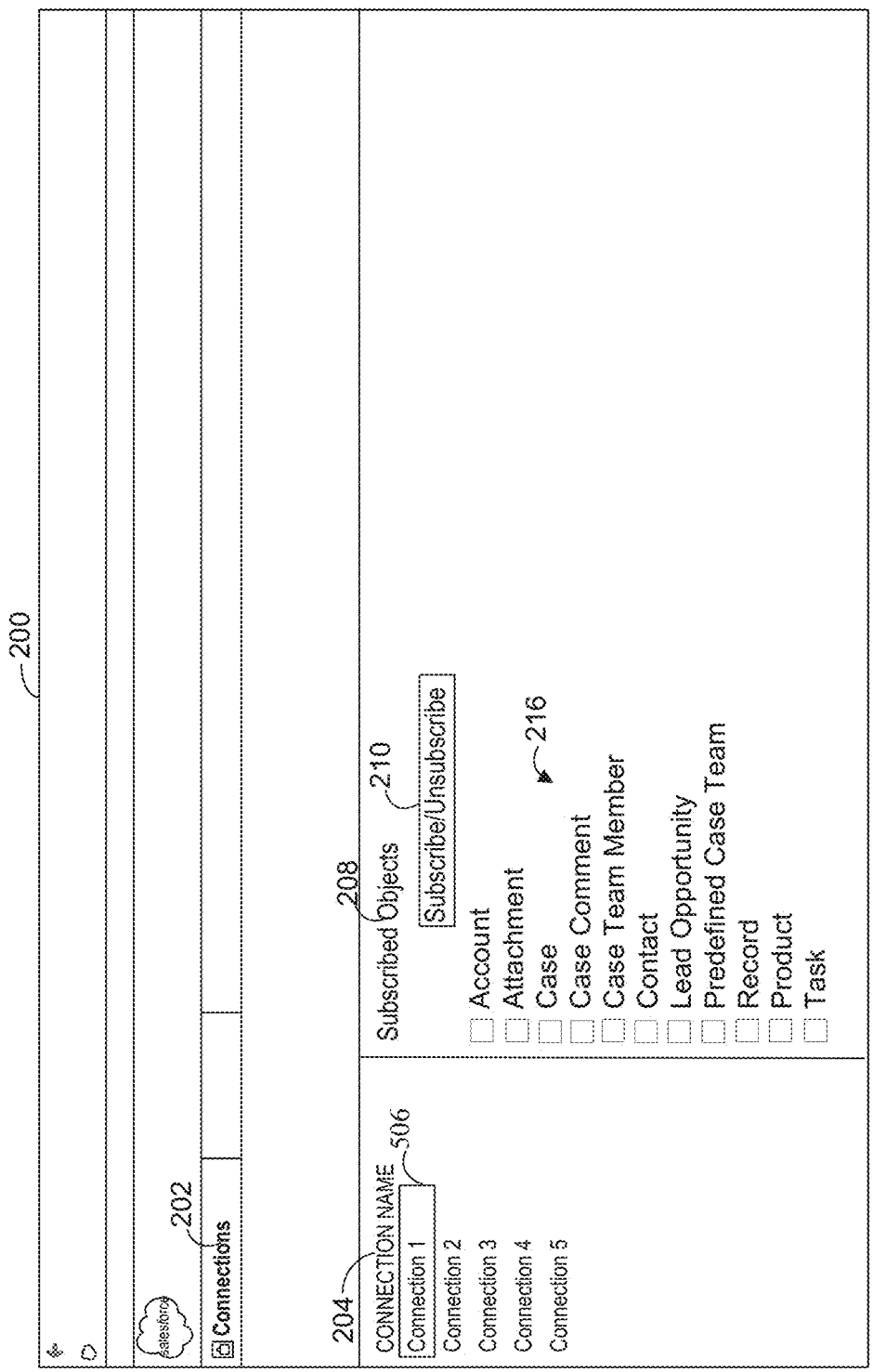
FIG. 2A shows an example of a UI 200 for providing subscription to published objects and associated fields, in accordance with some implementations.

FIG. 2A shows an example of a UI 200 for providing subscription to published objects and associated fields, in accordance with some implementations. In FIG. 2A, UI 200 includes a variety of graphical components situated at different locations in UI 200. These components include a Connections tab 202, which is one of possibly several or many tabs, which can be opened in UI 200. Each tab can be selected to access a respective page or segment of UI 200. In this example, after a user logs in to the secondary organization, the user navigates to Connections tab 202 and selects Connections tab 202 to access Connections component 204 of UI 200. Connections component 204 presents a number of existing connections in the Connection Name column of Connections component 204. The user clicks on the name of a connection to select a particular connection 206 between two organizations. As shown in FIG. 2A, Connection 1 between the primary organization and the secondary organization has been selected by the user of the secondary organization.

In FIG. 2A, another component of UI 200 is a Subscribed Objects component 208. In this example, Subscribed Objects component 208 is configured with a Subscribe/Unsubscribe component 210, which the user can click on to subscribe to data types (e.g., specific object types and/or associated fields) of database(s) of the primary organization. By the same token, the user can click on Subscribe/Unsubscribe component 210 to unsubscribe to specific data types (e.g., object types and/or associated field(s) of database(s)) of the primary organization. In this example, the user clicks on Subscribe/Unsubscribe component 210, which enables the user to select from published object types and associated fields.

Figure 2B:
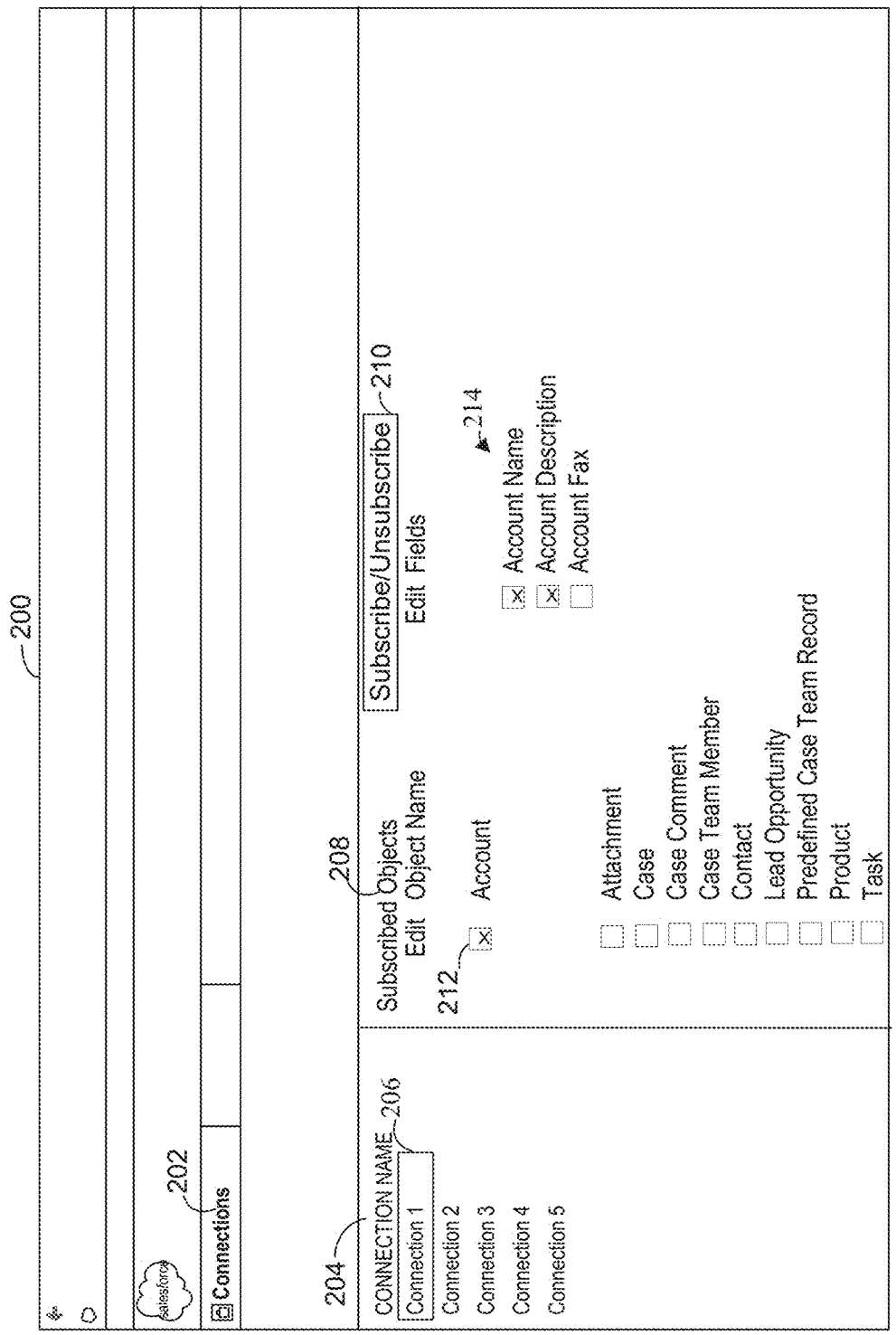
FIG. 2B shows an example of a different state of UI 200, in accordance with some implementations.

FIG. 2B shows an example of a different state of UI 200, in accordance with some implementations. In this example, to subscribe to a subset of the fields of a particular object type, the user may click on an Edit component 212 to select specific fields for a particular object type. In this example, the user has chosen to select fields for the "Account" object type. As shown in FIG. 2B, the user has elected to subscribe to the "Account Name" and "Account Description" fields of the "Account" object type, but not the "Account Fax" field of the "Account" object type. The term "subscription data" may be used to refer to metadata that indicates a subset of the published data types (e.g., object types and/or fields) to which the secondary organization has subscribed.

Each organization may use standard databases or custom database(s). Customization of a database may include using custom object types and/or custom fields. As a result, the fields of the primary organization may not map directly to fields of the database(s) of the secondary organization.

To subscribe to specific object types of the primary organization, a user of the secondary organization may map selected published object types to object types of the secondary organization. In addition, a user of the secondary organization may map selected published fields to fields of the secondary organization.

Figure 2C:
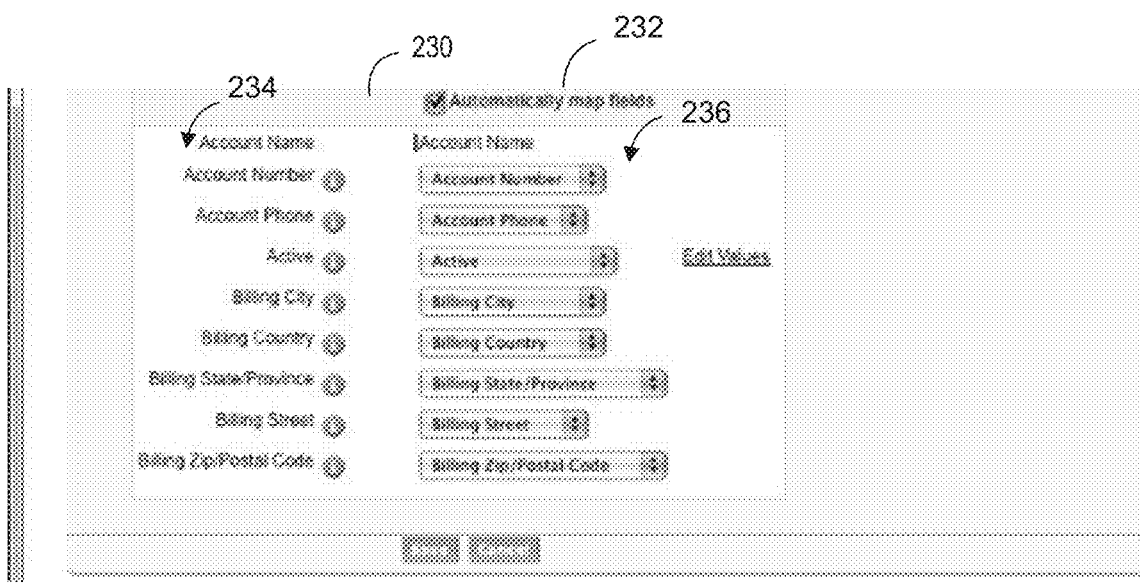
FIG. 2C shows an example of a UI 230 for mapping fields, in accordance with some implementations.

FIG. 2C shows an example of a UI 230 for mapping fields, in accordance with some implementations. In FIG. 2C, a user has elected to subscribe to the object type "Account." A component of UI 230 is a graphical representation 232 that may be selected to automatically map the published fields of the object type "Account" to fields of the secondary organization. As shown in FIG. 2C, published fields 204 of the primary organization may be presented in the form of a list adjacent to selectable fields 206 of the secondary organization. In this example, each field of the published object type, "Account," is mapped to the same field of the object type, "Account," in the secondary organization. Therefore, the subscription data may indicate the mapping between the objects and fields of the primary organization and those of the secondary organization.

After the subscription data has been updated, the secondary organization may initiate a subscription process to communicate the subscription data to the primary organization. Upon completion of the subscription process, data items corresponding to the subscription data and stored in database(s) of the primary organization may be shared with the secondary organization. More particularly, data items may be shared via the connection between the organizations. In some implementations, updates to the data items are automatically shared with the secondary organization. For example, updates to data items may be replicated in database(s) of the secondary organization. As another example, updates to data items may be forwarded to the secondary organization, enabling the secondary organization to accept or reject the updates. In other implementations, updates to the data items are shared with the secondary organization in response to a manual operation.

Updates to data items may include, but are not limited to, creating (e.g., storing) a data item, modifying a data item, and/or deleting a data item. A data item may correspond to one or more fields of a database. For example, a data item may be an object (e.g., record) corresponding to a particular object type. As another example, a data item may correspond to a particular field of an object.

Figure 3:
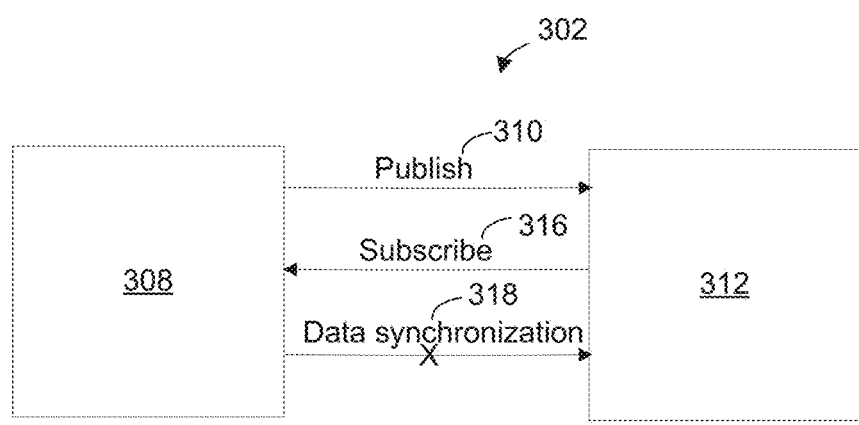
FIG. 3 shows a block diagram of an example of a system in which data synchronization is performed, in accordance with some implementations.

FIG. 3 shows a block diagram of an example of a system 302 in which data synchronization is performed, in accordance with some implementations. As shown in this example, a primary organization 308 provides publish data at 310 for subscription by a second organization 312. Secondary organization 312 provides subscribe data to primary organization 308 at 316. Data synchronization is performed at 318 such that data maintained by primary organization 308 that corresponds to the subscribe data is shared with secondary organization 312. For example, updates to data maintained by primary organization 308 may be replicated in database(s) of secondary organization 312.

Data synchronization may be performed via distinct data synchronization events. In some implementations, data synchronization events are managed via one or more event queues. For example, the first organization may update field(s) of a data object stored in a database of a database system of the first organization, delete a record of a database of the database system of the first organization, or insert a record in a database of the database system of the first organization. To share the data maintained in the database system of the first organization (or associated updates to the data), the first organization may add a queue entry to an event queue, where the queue entry pertains to a data update event to be performed in relation to a database system of the second organization. The queue entry may indicate a data update event having an event type. Example event types include, but are not limited to, Insert, Delete, and Update. Insert pertains to the insertion of a data item (e.g., data record) in a database of the database system of the second organization, Delete pertains to the deletion of a data item (e.g., data record) from a database of the database system of the second organization, and Update pertains to the modification of a data item (e.g., field of a data record) of a database of the database system of the second organization.

An event handler (e.g., message handler) may initiate the processing of events indicated by queue entries of event queue(s) and update the event queue(s) as the events are processed. More particularly, upon successful completion of the processing of an event, the corresponding queue entry may be deleted from event queue(s). If an event is not processed successfully or primary organization 308 ascertains that it is unable to communicate with secondary organization 312, primary organization may suspend data synchronization until the communication between primary organization 308 and secondary organization 312 is re-established.

Figure 4:
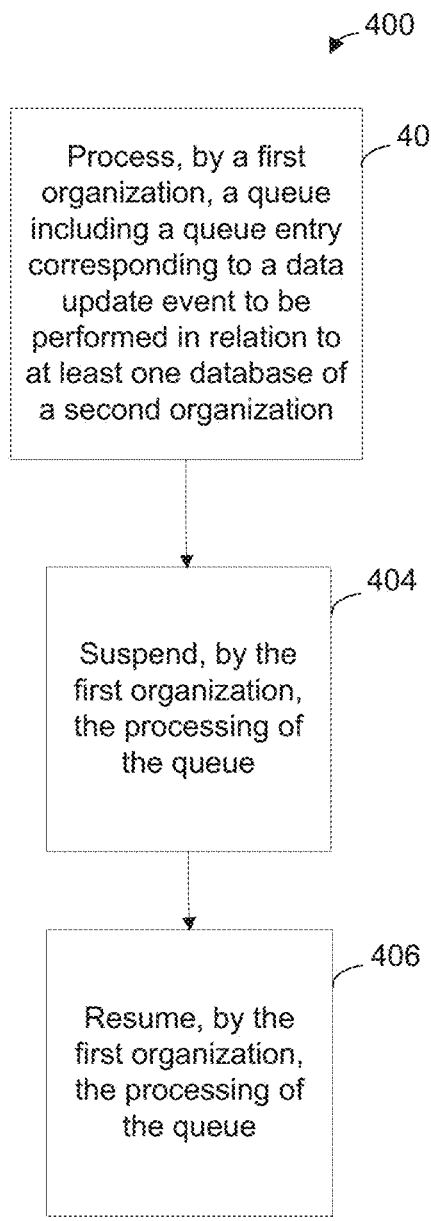
FIG. 4 shows a flowchart of an example of a method 400 for suspending and resuming the synchronization of data, in accordance with some implementations.

FIG. 4 shows a flowchart of an example of a method 400 for suspending and resuming the synchronization of data, in accordance with some implementations. As shown in FIG. 4, a first organization processes at least one event queue at 402. Each event queue may have one or more queue entries. More particularly, an event queue may include a queue entry that pertains to a corresponding data update event to be performed in relation to database(s) of a second organization. The queue entry may have a set of parameter values associated therewith. The queue may be processed by obtaining the set of parameter values from the queue entry and initiating an update to the data stored in database(s) of the second organization using the parameter values. The set of parameter values may identify or otherwise indicate an event type of the data update event. In addition, the parameter values may indicate an identity of a pertinent record of the primary organization and/or the secondary organization. For example, the parameter values may include a link (e.g., pointer) to the pertinent record of a database of the primary organization and/or the secondary organization. Where a record is to be inserted in a database of the second organization, the parameter values may indicate an object type and, for each field of the object type, a corresponding data value. In other instances, where a data value for a particular field of a record of a database of the secondary organization is to be modified, the parameter values may indicate an identity of the record, a field within the record, and/or a data value reflecting an updated value for the data item. Alternatively, the parameter values may indicate that a particular data record is to be deleted from the database(s) of the second organization.

In some implementations, database(s) of the second organization may be updated via an application programming interface (API) of the second organization. For example, the primary organization may call the API with an event type. As another example, the primary organization may call the API with one or more of the parameter values.

As shown in FIG. 4, processing of the queue may be suspended at 404. Processing may be suspended in response to a manual command submitted via a UI. Alternatively, processing may be suspended automatically. More particularly, the first organization may suspend processing of the queue in response to detecting a failure of a connection between the primary organization and the secondary organization. For example, the failure of the connection may be detected by sending one or more ping messages to the secondary organization. As another example, the failure of the connection may be detected based upon a failure during the processing of a data update event or other event.

A ping message is typically sent to test the reachability of a host on an Internet Protocol (IP) network. As will be described in further detail below, a ping message is sent by a computing device of the first organization to check that a computing device of the second organization is present and listening to the network. Upon receiving the ping message, the computing device of the second organization sends a reply in response to the ping message. In some implementations, a ping message includes an Internet Control Message Protocol (ICMP) echo request, while a ping reply includes an ICMP echo reply.

After suspending the processing of the queue (and data synchronization), the primary organization may periodically monitor, in real-time, the connection between the primary organization and the secondary organization. For example, the primary organization may send a set of one or more first communications (e.g., pings) to the secondary organization. The primary organization may determine whether the connection has been re-established (e.g., whether the connection is active) based upon whether it has received a set of one or more second communications (e.g., ping replies) from the secondary organization responsive to the set of first communications. This process may be referred to as pinging.

After the processing of the queue is suspended, the processing of the queue may be resumed at 406. More particularly, the primary organization may resume processing of the queue in response to detecting that the connection between the primary organization and the secondary organization is active. For example, the primary organization may detect that communication between the organizations has been re-established based upon the success of one or more ping messages (e.g., upon receiving a ping reply to each of the ping messages).

Figure 5:
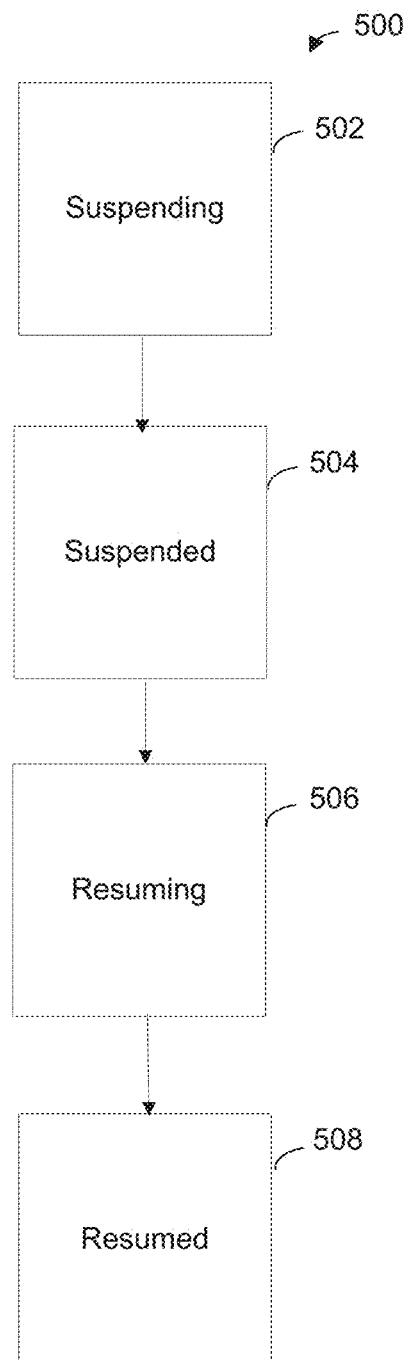
FIG. 5 shows a flowchart of an example of a method 500 presenting state changes initiated as a result of automatically suspending and resuming the synchronization of data, in accordance with some implementations.

FIG. 5 shows a flowchart of an example of a method 500 presenting state changes initiated as a result of automatically suspending and resuming the synchronization of data, in accordance with some implementations. In some implementations, the connection state changes are performed in a particular order as shown in FIG. 5. As shown in this example, when the primary organization determines that there is communication failure, the primary organization may update the connection state to Suspending as shown at 502. The primary organization may continue to monitor the connection by pinging the secondary organization. Upon determining that communication between the organizations has not been re-established, the primary organization may update the connection state to Suspended as shown at 504. The primary organization may continue to monitor the connection, and ascertain that communication between the primary organization and the secondary organization is successful. The primary organization may then update the connection state to indicate that the connection has been re-established. As shown in FIG. 5, the primary organization may update the connection state to Resuming at 506. The primary organization may continue to monitor the connection to verify that re-establishment of the connection between the organizations is not transient. Upon confirming that communication between the organizations and the corresponding connection has been re-established, the primary organization may update the connection state to Resumed at 508.

In other implementations, the connection state may be updated among a different set of states. For example, the states may include the Suspend and Resumed states, but may not include the Suspending and Resuming states.

Figure 6A:
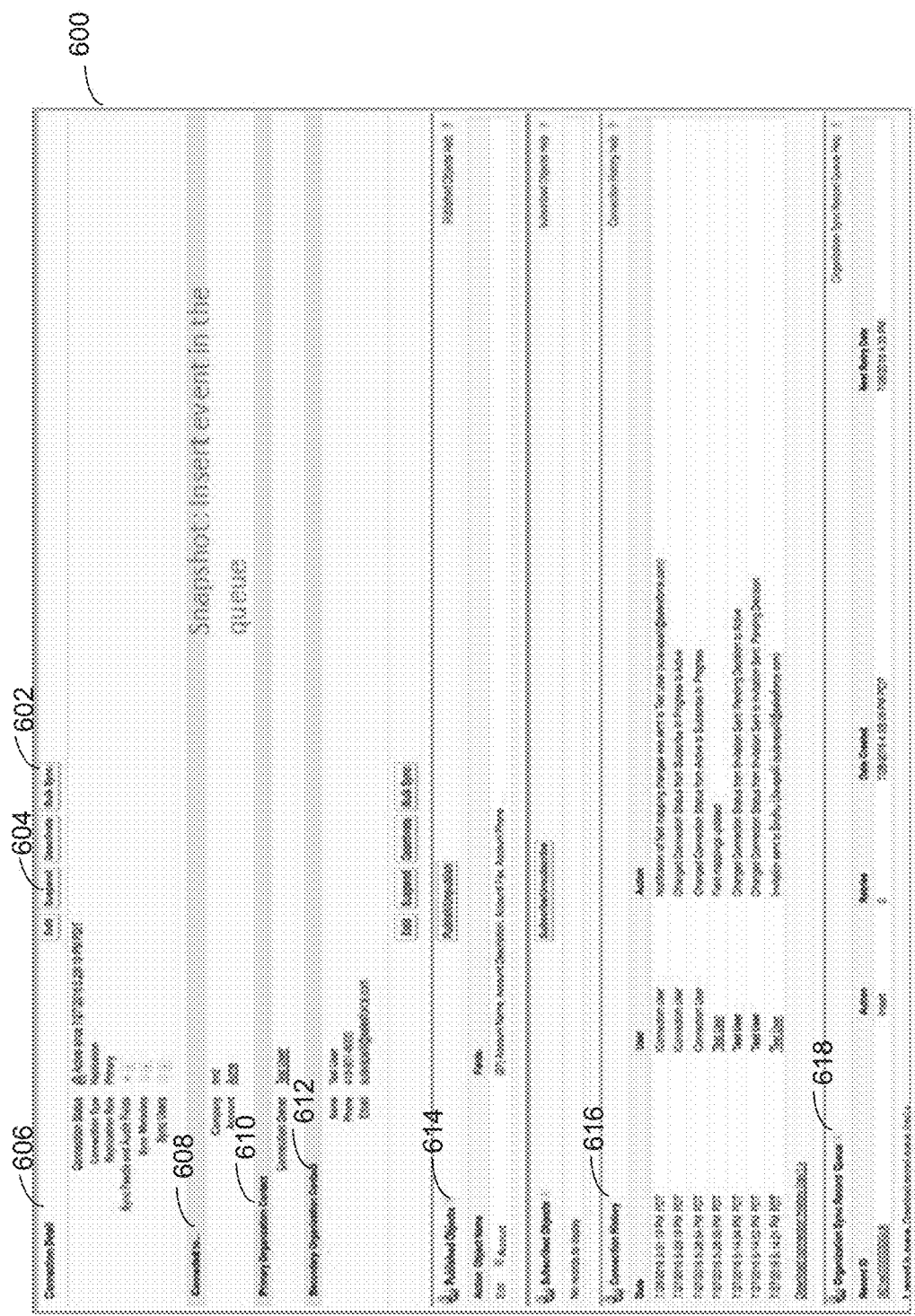
FIG. 6A shows an example of a UI 600 for presenting the contents of an event queue, in accordance with some implementations.

FIG. 6A shows an example of a UI 600 for presenting the contents of an event queue, in accordance with some implementations. In FIG. 6A, UI 600 includes a variety of graphical components situated at different locations in UI 600. In this example, after a user logs in to the primary organization, the user selects a connection between the primary organization and a secondary organization.

As shown in FIG. 6A, a user may choose to initiate the synchronization of data between the primary organization and the secondary organization by clicking on Bulk Sync component 602. A user may manually suspend data synchronization by clicking on Suspend component 604. In response to receiving the request to suspend data synchronization, the primary organization may suspend data synchronization. As a result, the primary organization may suspend processing of its event queue(s). In some implementations, suspending data synchronization may include suspending the connection between the primary organization and the secondary organization, as will be described in further detail below.

In FIG. 6A, another component of UI 600 is a Connection Detail component 606. In this example, Connection Detail component 606 indicates that the connection state of the connection is Active and indicates that the role of the organization is that of a primary organization.

Another component of UI 600 identifies the secondary organization 608 connected to the primary organization via the connection. Additional components of UI 600 may further present contact information for the primary organization and secondary organization, as shown at 610 and 612, respectively.

In this example, Published Objects component 614 indicates the object types and fields of data that are published by the primary organization. Connection History component 616 indicates that the subscription process has been completed and the connection is Active. During the Active state, data synchronization between the primary organization and secondary organization may be performed.

Organization Sync Record Queue component 618 may indicate the status of an event queue during data synchronization. The event queue may also be referred to as a record queue. In this example, an Insert event has been added as an entry to the queue. The entry may identify a particular data item or record to be inserted into database(s) of the secondary organization, as shown in FIG. 6A. In other instances, a Delete event may be added as an entry to the queue. For example, the entry may identify a particular data item or record to be deleted from database(s) of the secondary organization. In yet other instances, an Update (or Modification) event may be added as an entry to the queue. For example, the entry may indicate a data item (e.g., record and field) to be modified and a data value to which the field of the record is to be modified.

Figure 6B:
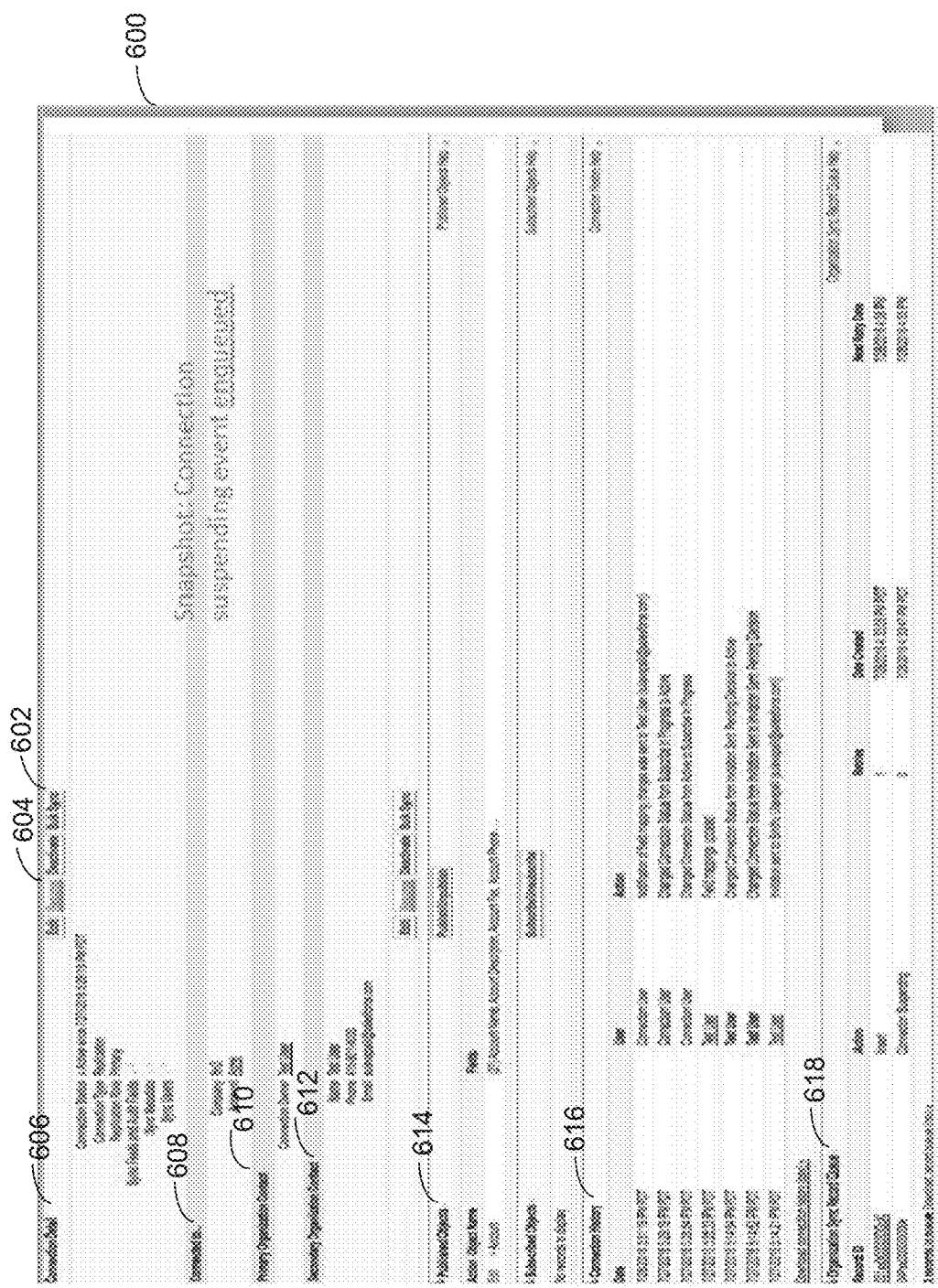
FIGS. 6B-6D show examples of different states of UI 600, in accordance with some implementations.
Figure 6C:
Figure 6D:

FIGS. 6B-6D show examples of different states of UI 600, in accordance with some implementations. Various methods of transitioning between the different states will be described in further detail below with reference to FIGS. 7A-7D.

In some implementations, each time the primary organization updates the connection state, the primary organization adds a corresponding queue entry to the event queue. More particularly, the queue entry may indicate a connection state update event. For example, the connection state update event may be Suspending, Suspended, Resuming, or Resumed. Upon retrieving the queue entry by an event handler, the primary organization may process the data update event (e.g., by suspending or resuming processing of the event queue).

As shown in FIG. 6B, Organization Sync Record Queue component 618 may be updated after the primary organization identifies a failure of the connection. As shown in this example, a queue entry indicating a change in the connection state to Suspending may be added to the event queue. In other implementations, the queue entry may indicate that the connection state is updated to Suspended.

The primary organization may monitor the connection and determine that communication between the organizations has not been re-established. As a result, the connection state may subsequently be updated to Suspended, as shown at 618 of FIG. 6C. In addition, data synchronization and processing of the event queue may be suspended.

After data synchronization and processing of the event queue is suspended, the primary organization may continue to monitor the connection. Upon determining that communication between the primary organization and the secondary organization is successful, the primary organization may update the connection state.

In some implementations, while the primary organization may ascertain that a recent communication (e.g., ping) between the primary organization and the secondary organization is successful, this improvement in the connection may be transient. Thus, the primary organization may update the connection state to Resuming, as shown at 618 of FIG. 6D. More particularly, a queue entry indicating that the connection state is updated to Resuming may be added to the event queue. The primary organization may then update the connection state to Resumed upon ascertaining that the connection between the organizations has been re-established. The primary organization may resume data synchronization and processing of the event queue upon updating the connection state to Resumed. In other implementations the primary organization may update the connection state to Resumed directly from the Suspended state.

Figure 7A:
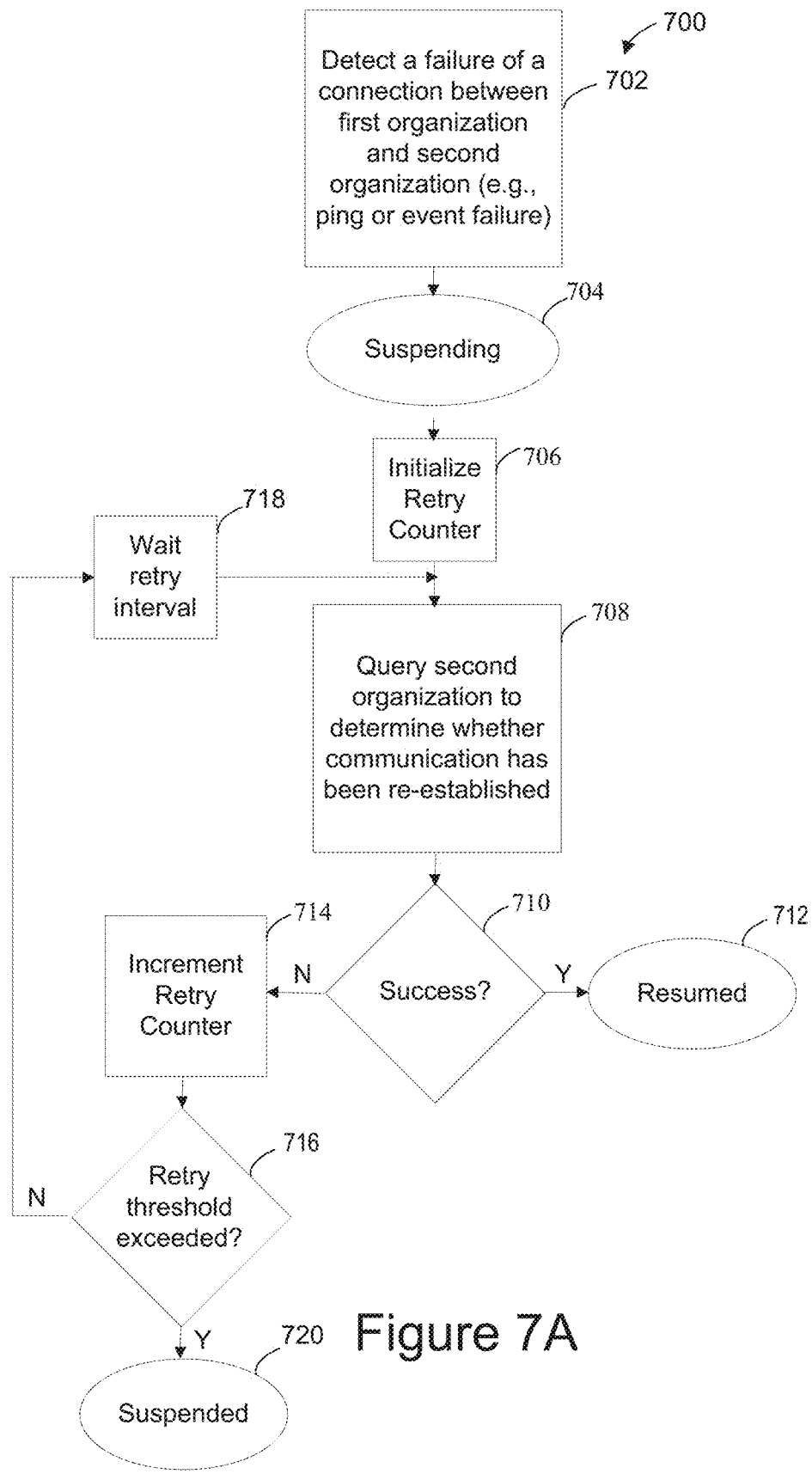
FIG. 7A shows a flowchart of an example of a method 700 for handling a connection suspending event, in accordance with some implementations.

FIG. 7A shows a flowchart of an example of a method 700 for handling a connection suspending event, in accordance with some implementations. In some implementations, the primary organization may initiate data synchronization between the primary organization and the secondary organization by processing data update events corresponding to event queue entries. When processing of a data update event fails or when one of the organizations is unable to communicate with the other organization, the primary organization may detect this communication failure at 702. For example, the primary organization may detect a communication failure by pinging the secondary organization. In this example, the primary organization updates the connection state to Suspending after it detects a single communication failure between the organizations, as shown at 704.

The primary organization may interpret a sequence of communication failures as a failure of the connection between the primary organization and the secondary organization. In some implementations, data synchronization may be temporarily suspended after the primary organization has detected a number of communication failures that meets or exceeds a particular threshold. To track the number of communication failures between the primary organization and the secondary organization, a retry counter may be initialized at 706. The primary organization may then test the connection between the organizations. More particularly, the primary organization may query the secondary organization at 708 to determine whether communication between the organizations is re-established. This query may also be referred to as a ping.

Data synchronization may be resumed when the primary organization determines that the connection between the organizations is re-established. As shown in FIG. 7A, the primary organization may determine whether communication between the organizations is re-established at 710. More particularly, if the primary organization receives a response to the query from the secondary organization, the primary organization may conclude that communication between the organizations is re-established. The response may also be referred to as a pong.

Upon determining that communication between the organizations is re-established (e.g., successful), the primary organization may update the connection state to Resumed at 712. However, if the primary organization does not receive a response to the query from the secondary organization, the primary organization may continue querying the secondary organization. The primary organization may increment the retry counter at 714 and compare the retry counter to a threshold at 716. For example, the threshold may be 5. If the primary organization determines that the retry counter does not exceed the threshold, the primary organization may wait an interval at 718 and continue to query the secondary organization at 720 at regular intervals (e.g., once every 5 minutes). For example, the interval may be 60 seconds.

In some implementations, if none of the queries within a threshold number of "retries" is successful, the primary organization may update the connection state to Suspended at 720. By limiting the number of retries to the threshold, the primary organization may conclude within a limited amount of time that communication between the organizations has not been re-established. In other implementations, rather than counting the number of retries, the primary organization may limit the period of querying time to a specific time period. For example, the primary organization may apply a threshold time period of 5 minutes and update the connection state to Suspended if the primary organization does not successfully query the secondary organization during the threshold time period.

Figure 7B:
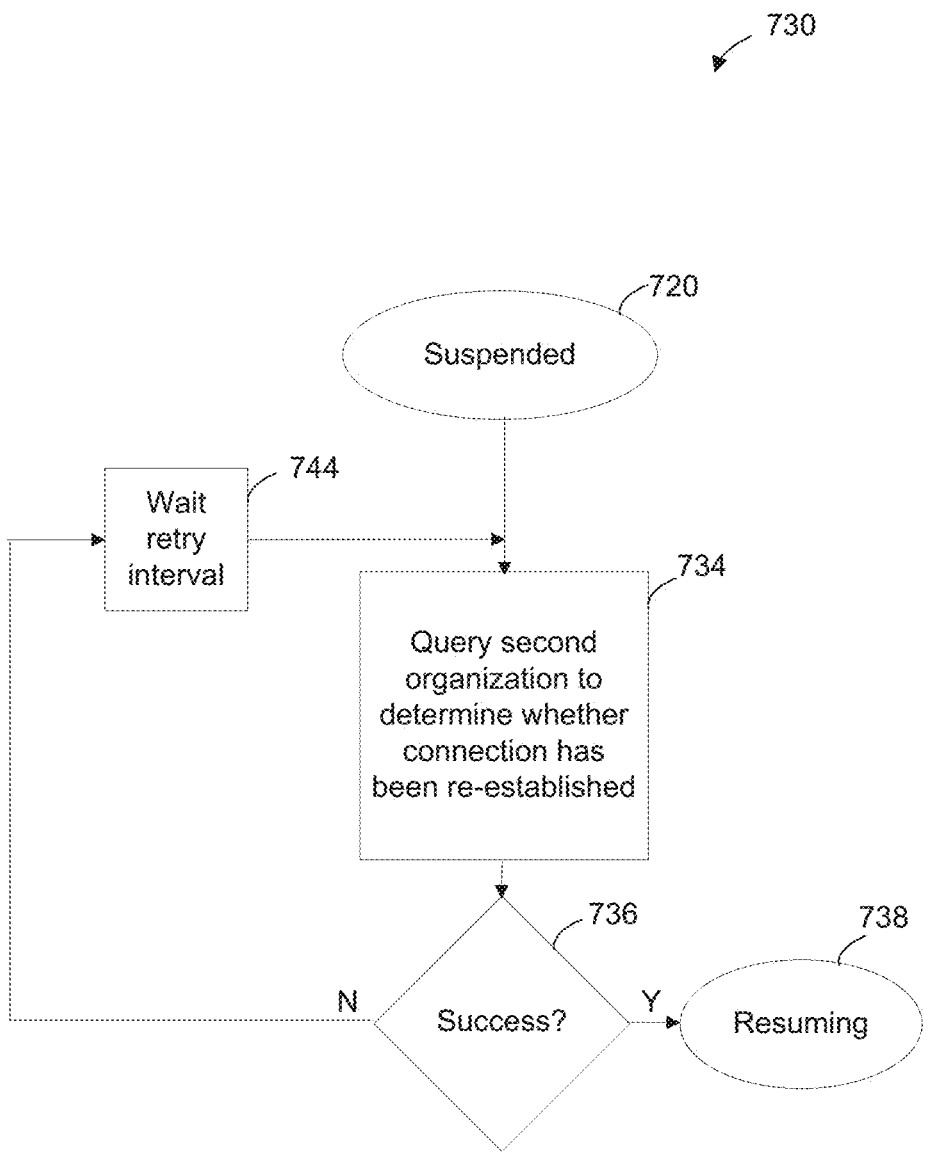
FIG. 7B shows a flowchart of an example of a method 730 for handling a connection suspended event, in accordance with some implementations.

FIG. 7B shows a flowchart of an example of a method 730 for handling a connection suspended event, in accordance with some implementations. After the connection state has been updated to Suspended as shown at 720, the primary organization may continue to query the secondary organization at 734. The primary organization determines whether the communication was successful at 736. If the query sent to the secondary organization is unsuccessful, the primary organization may continue to query the secondary organization at regular intervals 744 until it determines that communication between the organizations is successful. If the primary organization determines that the communication was successful, the connection state may be updated to indicate the change in the connection state. In this example, the connection state is updated to Resuming, as shown at 738. In other implementations, the connection state may be updated to Resumed.

Figure 7C:
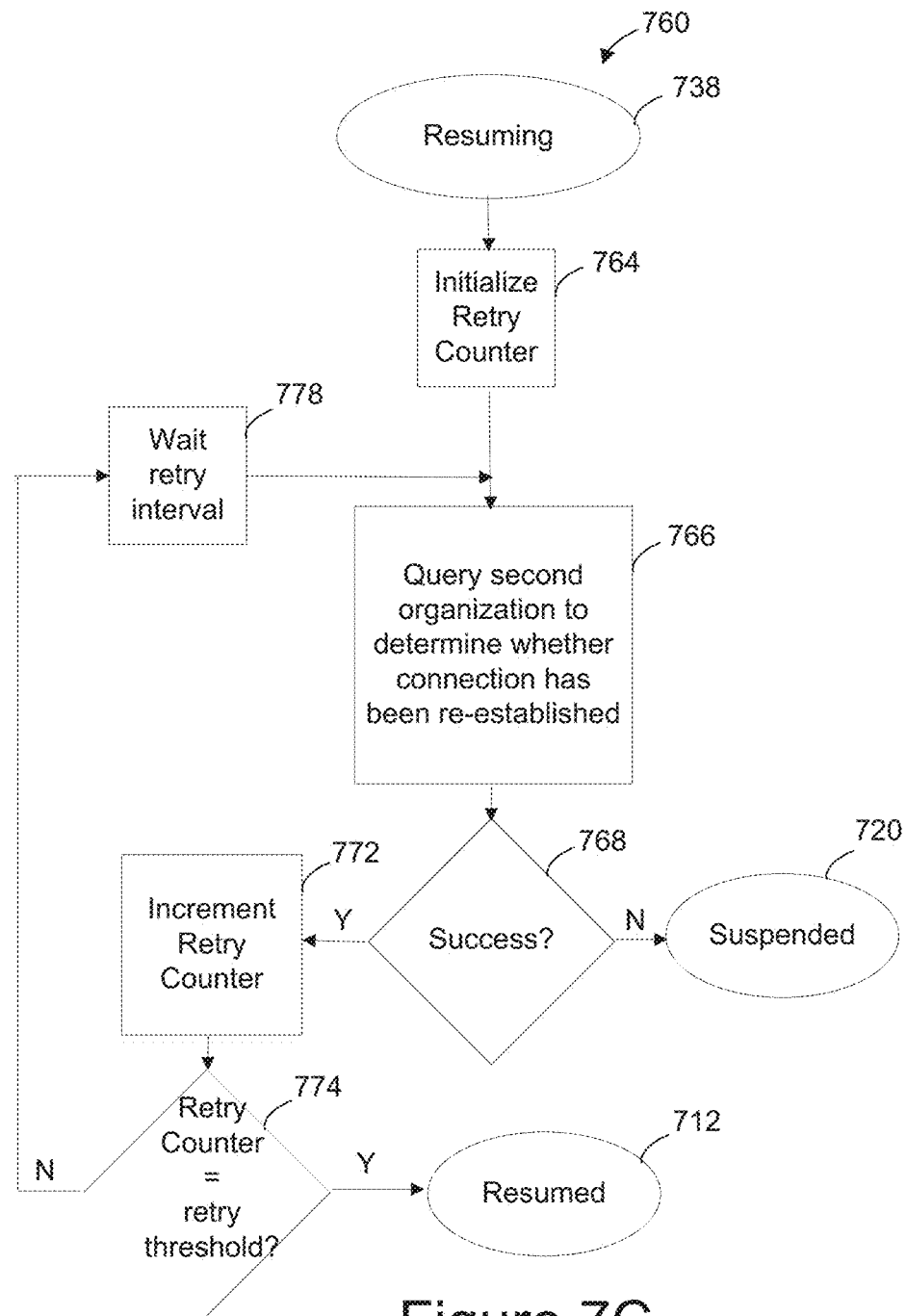
FIG. 7C shows a flowchart of an example of a method 760 for handling a connection resuming event, in accordance with some implementations.

FIG. 7C shows a flowchart of an example of a method 760 for handling a connection resuming event, in accordance with some implementations. After the connection state has been updated to Resuming at 738, the primary organization may initialize a retry counter at 764. In addition, the primary organization may query the secondary organization at 766 to determine whether communication between the primary organization and the secondary organization has been re-established. If the primary organization ascertains that the query has not been successful at 768, the primary organization may conclude that communication between the primary organization and the secondary organization has not been re-established. The primary organization may then update the connection state to Suspended at 720.

In some implementations, the primary organization updates the connection state to Resumed after a threshold number of queries to the secondary organization are successful. For example, as shown in FIG. 7C, the primary organization may increment the retry counter at 772 and compare the retry counter to the threshold at 774. Based upon this comparison, the primary organization may ascertain that a sequence of a threshold number of queries to the secondary organization have been successful and update the connection state to Resumed at 712. If the threshold has not yet been met, the primary organization may continue to query the secondary organization at regular time intervals as shown at 778. For example, where the threshold is set to 5, the primary organization may update the connection state to Resumed if each query in a sequence of 5 queries is successful; if one of the queries fails, the primary organization may update the connection state to Suspended.

Figure 7D:
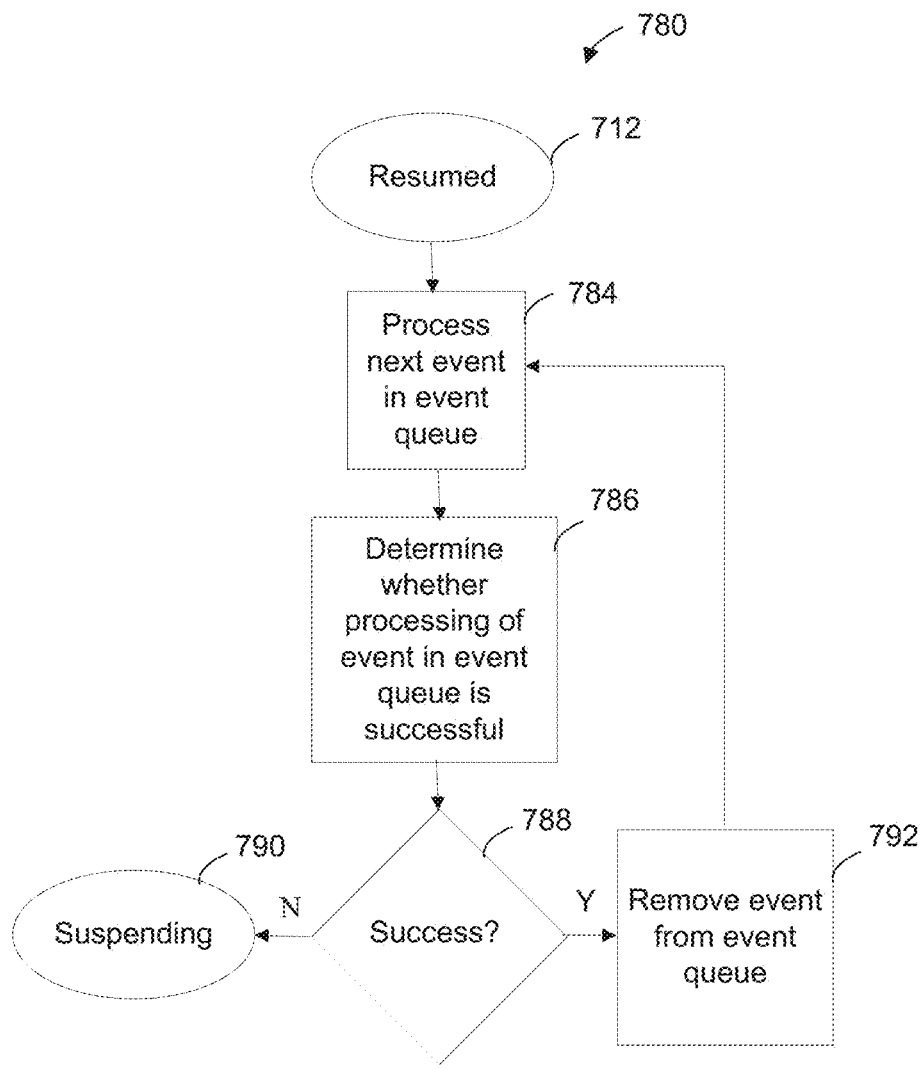
FIG. 7D shows a flowchart of an example of a method 790 for handling a connection resumed event, in accordance with some implementations.

FIG. 7D shows a flowchart of an example of a method 780 for handling a connection resumed event, in accordance with some implementations. As described above, the primary organization may update the connection state to Resumed. In some implementations, the Resumed State is an Active state. After the connection state is updated to Resumed at 712, the primary organization may continue to perform data synchronization and process events in the event queue(s). As shown in this example, the primary organization may process the next event in the event queue at 784. The primary organization may determine whether processing of the event is successful at 786. If the primary organization determines that the processing of the event is not successful at 788, the primary organization may update the connection state to Suspending at 790. However, if the primary organization determines that the processing of the event is successful, the primary organization may continue to process events in the event queue at 784.

Some but not all of the techniques described or referenced herein are implemented using or in conjunction with a customer relationship management (CRM) system or other database management system. CRM systems have become a popular way to manage and analyze customer interactions and data throughout the business lifecycle. Salesforce.com, Inc. is a provider of CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud.

Some CRM systems can be implemented in various settings, including organizations. For instance, a CRM system can be implemented to provide database access to users within an enterprise such as a company or business partnership, or a group of users within such an organization. For instance, employee users in a division of a business organization may share data with users in another division of the business organization. In the example of a multi-tenant database system, each organization or group within the organization can be a respective tenant of the system, as described in greater detail below. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as customer sales data for a potentially much greater number of customers.

Where there are multiple tenants, a user is typically associated with a particular tenant. For example, a user could be a salesperson of a company, which is a tenant of the database system that provides a database service.

In some implementations, data objects in the form of CRM records such as cases, accounts, or opportunities are stored in a database system. Updates to a record may include any change to a record. Examples of record updates include field changes in the record, updates to the status of a record, as well as the creation or deletion of the record itself.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get.

In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

A record can also have a status, the update of which can be provided by an owner of the record or other users having suitable write access permissions to the record. The owner can be a single user, multiple users, or a group.

In various implementations, an event can be an update of a record and/or can be triggered by a specific action by a user. Which actions trigger an event can be configurable.

Some non-limiting examples of systems, apparatus, and methods are described below for implementing database systems and enterprise level networking systems in conjunction with the disclosed techniques. Such implementations can provide more efficient use of a database system. Data may be synchronized between a database system of a primary organization and a database system of a secondary organization. Data synchronization may be suspended and resumed, as described above.

Figure 8A:
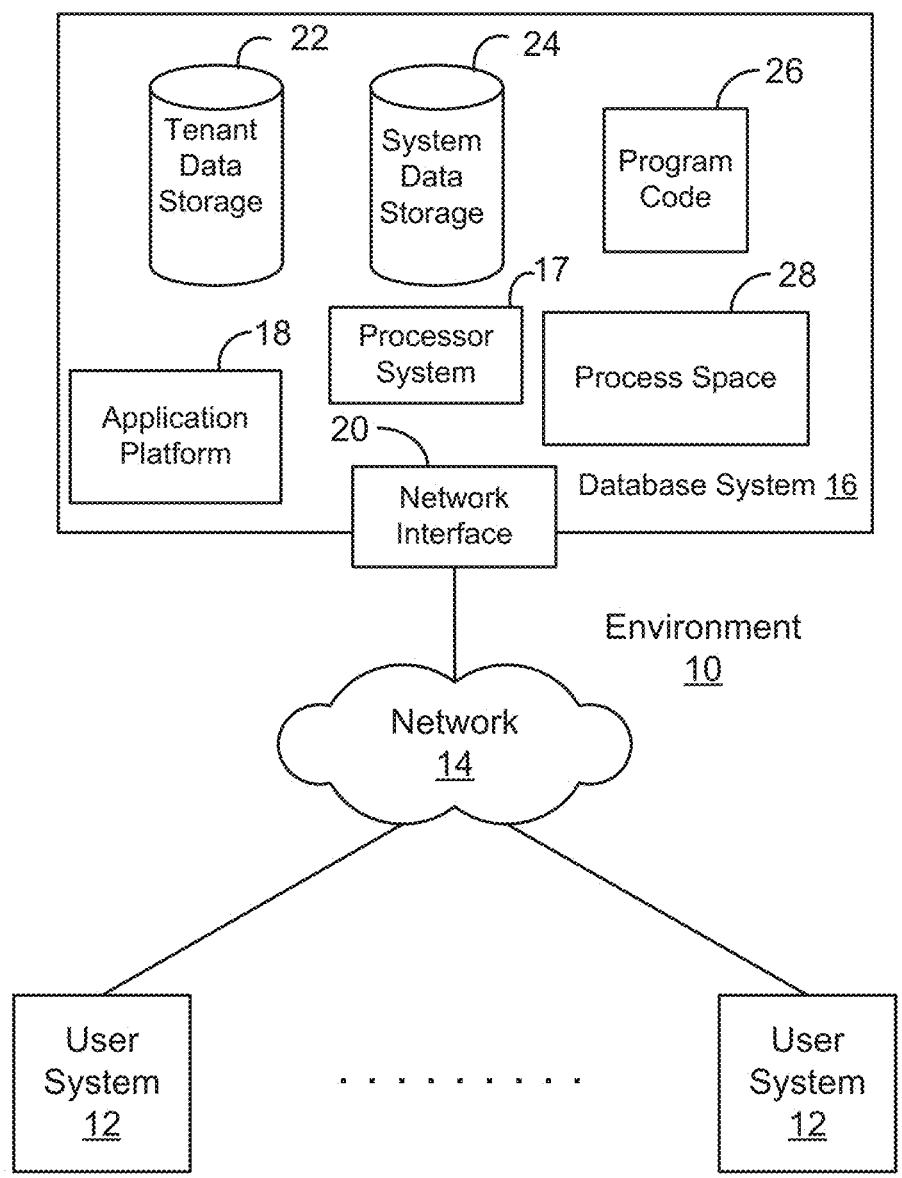
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creating, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation of applications, storage of the applications into one or more database objects and executing of the applications in a virtual machine in the process space of the system 16.

Figure 8B:
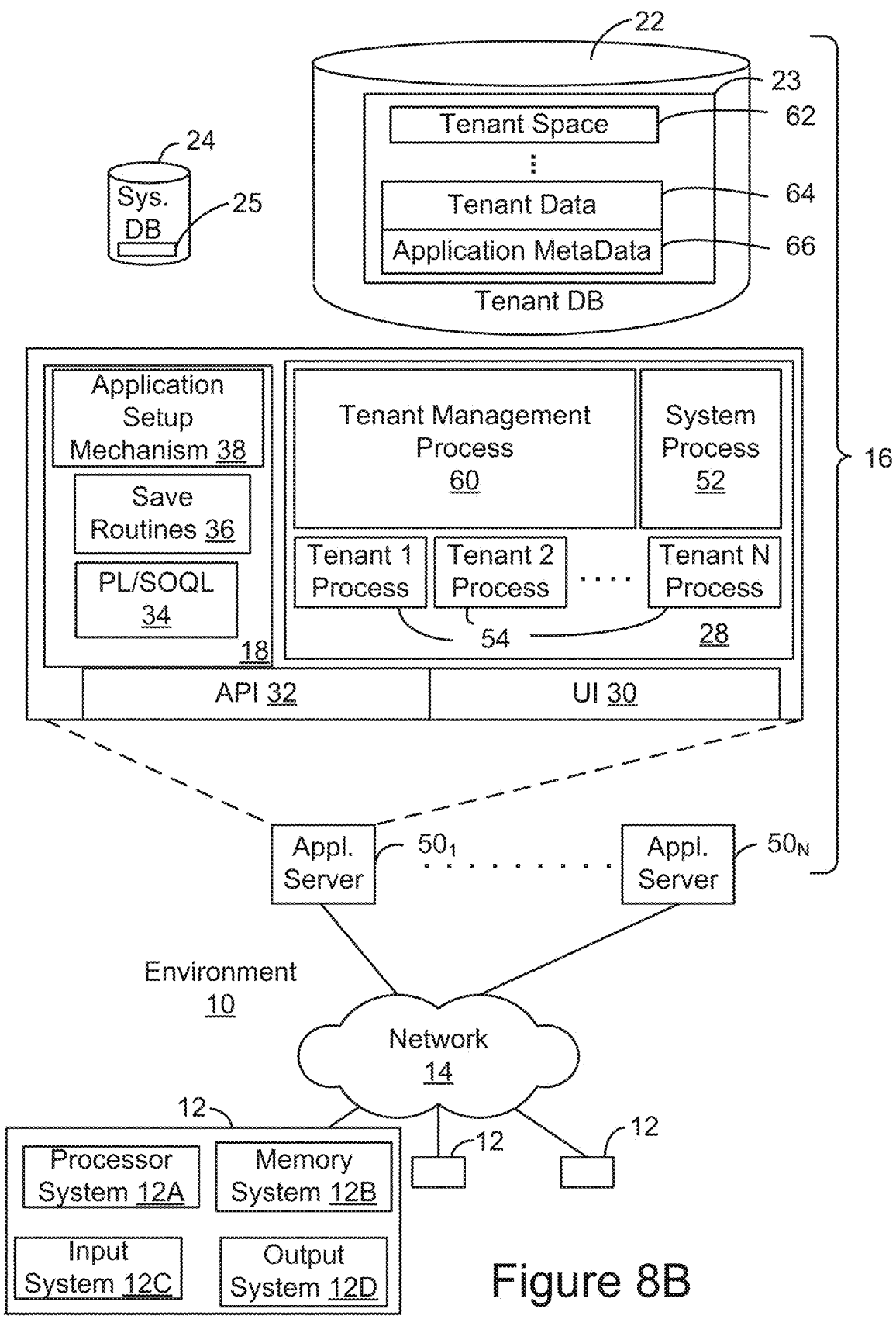
FIG. 8B shows a block diagram of an example of some implementations of elements of FIG. 8A and various possible interconnections between these elements.

One arrangement for elements of system 16 is shown in FIGS. 8A and 8B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer." User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc. can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and/or update system-level or tenant-level data from system 16, which may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data (e.g., data item) for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
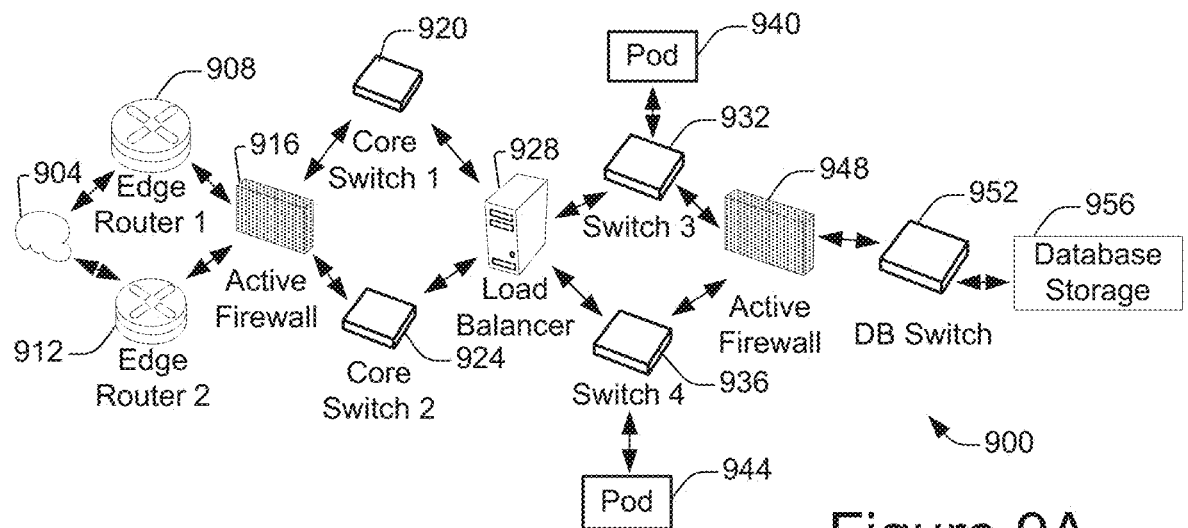
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 9B:
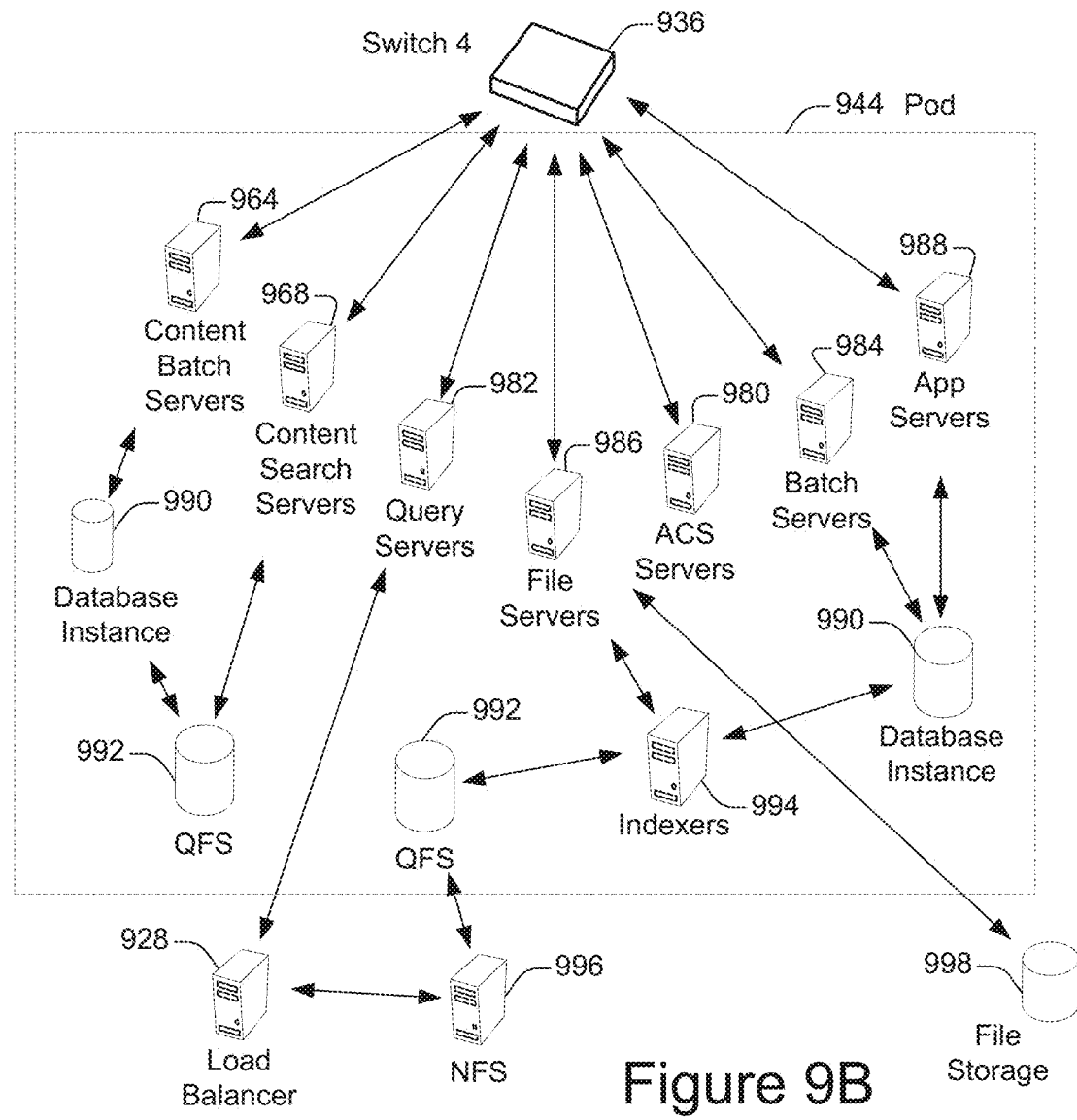
FIG. 9B shows a system diagram further illustrating an example of architectural components of an on-demand database service environment, in accordance with some implementations.

As shown in FIGS. 9A and 9B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 9A and 9B, some implementations of an on-demand database service environment may include any-where from one to many devices of each type. Also, the on-demand database service environment need not include each device shown in FIGS. 9A and 9B, or may include additional devices not shown in FIGS. 9A and 9B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIG. 9B.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 8A and 8B include a hardware and/or software framework configurable to execute procedures using programs, routines, scripts, etc. Thus, in some implementations, one or more of application servers 50$_1$-50$_N$ of FIG. 8B can be configured to initiate performance of one or more of the operations described above with reference to FIGS. 1A-7D by instructing another computing device to perform an operation. In some implementations, one or more application servers 50$_1$-50$_N$ carry out, either partially or entirely, one or more of the disclosed operations described with reference to FIGS. 1A-7D. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein, including operations described above with reference to FIGS. 1A-7D. In alternative implementations, two or more app servers 988 may cooperate to perform or cause performance of such operations. Any of the databases and other storage facilities described above with reference to FIGS. 8A, 8B, 9A and 9B can be configured to store lists, articles, documents, records, files, and other objects for implementing the operations described above with reference to FIGS. 1A-7D. For instance, lists of published fields associated with corresponding connections can be maintained in tenant data storage 22 and/or system data storage 24 of FIGS. 8A and 8B. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 8A, 8B, 9A and 9B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a first database system implemented using a server system, the first database system configurable to cause:
processing a queue having at least one queue entry, the queue entry pertaining to a data update event, the data update event pertaining to the first database system and an update to be performed in relation to a second database system, wherein the queue entry indicates the update to be performed in relation to the second database system, the first database system being associated with a first organization and the second database system being associated with a second organization, the processing of the queue comprising:
obtaining a set of parameter values from the queue entry, and
initiating an update to at least one database of the second database system using the set of parameter values;
detecting a failure of a connection between the first database system and the second database system;
responsive to detecting the failure of the connection between the first database system and the second database system, automatically suspending the processing of the queue; and
after suspending the processing of the queue, detecting an active connection between the first database system and the second database system;
after detecting the active connection between the first database system and the second database system,
determining whether a threshold number of responses are received from the second database system; and
verifying that the active connection is not transient based, at least in part, on a result of determining whether the threshold number of responses are received from the second database system;
resuming the processing of the queue responsive to verifying that the active connection is not transient.

2. The system as recited in claim 1, the first database system further configurable to cause:
after detecting the active connection between the first database system and the second database system, sending a set of first communications to the second database system; and
wherein determining whether a threshold number of responses are received from the second database system includes ascertaining that the threshold number of second communications are received from the second database system in response to the set of first communications.

3. The system as recited in claim 1, the first database system further configurable to cause:
sending a set of one or more first communications to the second database system;
wherein detecting a failure of a connection between the first database system and the second database system includes ascertaining that a set of one or more second communications has not been received from the second database system in response to the set of first communications.

4. The system as recited in claim 1, the first database system further configurable to cause: periodically monitoring, in real-time, the connection between the first database system and the second database system;
wherein an active connection between the first database system and the second database system is detected according to a result of periodically monitoring the connection between the first database system and the second database system.

5. The system as recited in claim 1, wherein processing the queue comprises:
calling an Application Programming Interface (API) of the second database system using the set of parameter values.

6. The system as recited in claim 1, wherein detecting a failure of a connection between the first database system and the second database system comprises detecting a failure during processing of the update to the database of the second database system using the set of parameter values.

7. The system as recited in claim 1, the set of parameter values indicating one or more of:
a) an identity of a particular data item or record to be added or deleted;
b) a data value of a field of a data record to be modified; or
c) a type of the data update event, the type of the data update event including an addition, deletion, or modification.

8. The system as recited in claim 1, wherein determining whether a threshold number of responses are received from the second database system comprises:
determining that a sequence of the threshold number of second communications are received from the second database system in response to a sequence of first communications transmitted to the second database system.

9. A method, comprising:
processing, by one or more servers associated with a first organization, a queue having at least one queue entry, the queue entry pertaining to a data update event, the data update event pertaining to a first database system associated with the first organization and an update to be performed in relation to a second database system associated with a second organization, wherein the queue entry indicates the update to be performed in relation to the second database system associated with the second organization, the processing of the queue comprising:
obtaining a set of parameter values from the queue entry, and
initiating an update to a database of the second database system associated with the second organization using the set of parameter values;
detecting, by the one or more servers, a failure of a connection between the first database system and the second database system;

responsive to detecting, by the one or more servers, the failure of the connection between the first database system and the second database system, automatically suspending, by the one or more servers associated with the first organization, the processing of the queue; and after suspending the processing of the queue, detecting, by the one or more servers, an active connection between the first database system and the second database system;

after detecting the active connection between the first database system and the second database system,
determining whether a threshold number of responses are received from the second database system; and
verifying that the active connection is not transient based, at least in part, on a result of determining whether the threshold number of responses are received from the second database system;

resuming, by the one or more servers associated with the first organization, the processing of the queue responsive to verifying that the active connection is not transient.

10. The method as recited in claim 9, further comprising:
sending a set of first communications to the second database system;
wherein determining whether a threshold number of responses are received from the second database system includes ascertaining that the threshold number of second communications are received from the second database system in response to the set of first communications.

11. The method as recited in claim 9, further comprising:
sending a set of one or more first communications to the second database system;
wherein detecting a failure of a connection between the first database system and the second database system includes ascertaining that a set of one or more second communications has not been received from the second database system in response to the set of first communications.

12. The method as recited in claim 9, further comprising:
periodically monitoring by the one or more servers, in real-time, the connection between the first database system and the second database system associated with the second organization;
wherein an active connection between the first database system and the second database system is detected according to a result of periodically monitoring the connection between the first database system and the second database system.

13. The method as recited in claim 9, wherein processing the queue comprises:
calling an Application Programming Interface (API) of the second database system using the parameter values.

14. The method as recited in claim 9, the set of parameter values indicating one or more of:
a) an identity of a particular data item or record to be added or deleted;
b) a data value of a field of a data record to be modified; or
c) a type of the data update event, the type of the data update event including an addition, deletion, or modification.

15. The method as recited in claim 9, wherein determining whether a threshold number of responses are received from the second database system comprises:
determining that a sequence of the threshold number of second communications are received from the second database system in response to a sequence of first communications transmitted to the second database system.

16. A computer program product comprising computer-readable program code capable of being executed by one or more processors when retrieved from a non-transitory computer-readable medium, the program code comprising instructions configurable to cause:
processing a queue having at least one queue entry, the queue entry pertaining to a data update event, the data update event pertaining to a first database system and an update to be performed in relation to a second database system associated with a second organization, wherein the queue entry indicates the update to be performed in relation to the second database system, the first database system being associated with a first organization and the second database system being associated with a second organization, the processing of the queue comprising:
obtaining a set of parameter values from the queue entry, and
initiating an update to at least one database of the second database system using the set of parameter values;

detecting a failure of a connection between the first database system and the second database system;
responsive to detecting the failure of the connection between the first database system and the second database system, automatically suspending the processing of the queue; and
after suspending the processing of the queue, detecting an active connection between the first database system and the second database system;
after detecting the active connection between the first database system and the second database system,
determining whether a threshold number of responses are received from the second database system; and
verifying that the active connection is not transient based, at least in part, on a result of determining whether the threshold number of responses are received from the second database system;
resuming, the processing of the queue responsive to verifying that the active connection is not transient.

17. The computer program product as recited in claim 16, the program code comprising instructions further configured to cause:
sending a set of first communications to the second database system;
wherein determining whether a threshold number of responses are received from the second database system includes ascertaining that the threshold number of second communications are received from the second database system in response to the set of first communications.

18. The computer program product as recited in claim 16, the program code comprising instructions further configured to cause:
sending a set of one or more first communications to the second database system;
wherein detecting a failure of a connection between the first database system and the second database system includes ascertaining that a set of one or more second communications has not been received from the second database system in response to the set of first communications.

19. The computer program product as recited in claim 16, the program code comprising instructions further configured to cause:
- periodically monitoring, in real-time, a connection between the first database and the second database system;
- wherein an active connection between the first database system and the second database system is detected according to a result of periodically monitoring the connection between the first database system and the second database system.

20. The computer program product as recited in claim 16, wherein determining whether a threshold number of responses are received from the second database system comprises:
- determining that a sequence of the threshold number of second communications are received from the second database system in response to a sequence of first communications transmitted to the second database system.

* * * * *